United States Patent [19]

Champagne et al.

[11] Patent Number: 5,023,861
[45] Date of Patent: Jun. 11, 1991

[54] SINGLE STAGE TRACKING ACTUATOR APPARATUS FOR OPTICAL BEAM INFORMATION STORAGE DRIVE SYSTEM

[75] Inventors: Patrick J. Champagne; Ingolf Sander, both of Cupertino, Calif.

[73] Assignee: Literal Corporation, Colorado Springs, Colo.

[21] Appl. No.: 287,801

[22] Filed: Dec. 20, 1988

[51] Int. Cl.[5] .......................... G11B 21/02; G11B 7/09
[52] U.S. Cl. ................................. 369/215; 369/44.15; 369/44.16
[58] Field of Search ................... 369/215, 44.15, 44.16; 350/255; 250/201.1

[56] References Cited

U.S. PATENT DOCUMENTS

| | | | |
|---|---|---|---|
| Re. 32,285 | 11/1986 | Farmer et al. | 360/106 |
| 4,557,564 | 12/1985 | Van Rosmalen | 369/44.15 |
| 4,607,913 | 8/1986 | Jansen | 350/247 |
| 4,680,743 | 7/1987 | Araki | 369/44.16 |
| 4,731,770 | 3/1988 | Petersen | 369/215 |
| 4,740,946 | 4/1988 | Yumura et al. | 369/219 |
| 4,752,117 | 6/1988 | Ichikawa et al. | 350/255 |
| 4,813,033 | 3/1989 | Baasch et al. | 350/255 |
| 4,916,684 | 4/1990 | Odawara | 369/215 |

Primary Examiner—Stuart S. Levy
Assistant Examiner—Tan Nguyen
Attorney, Agent, or Firm—Kinney & Lange

[57] ABSTRACT

Single stage tracking actuator apparatus for an optical or magneto-optical disk drive system in which a read/-write head is suspended by parallel flexures between mutually isolated magnetic circuits disposed on opposite sides of the head, one of the magnetic circuits being nested in the span between the parallel flexures. The flexure suspension provides friction-free translatable motion of the head in the longitudinal direction parallel to a radial line relative to the information storage disk. An electromagnetic coil provided with tracking actuator signals is formed about the head axially concentric with and transverse to the longitudinal center line of the head and is centrally positioned on the head between the points at which the free ends of the flexures are attached to the ends of the head. The end turn segments of the coil are disposed transversely of magnetic flux lines in elongated air gaps formed in the magnetic circuits to provide the driving force for the actuator. The friction-free suspension permits the actuator to perform both the track seek and the tracking modes of operation.

9 Claims, 2 Drawing Sheets

SINGLE STAGE TRACKING ACTUATOR APPARATUS FOR OPTICAL BEAM INFORMATION STORAGE DRIVE SYSTEM

FIELD OF THE INVENTION

This invention relates to tracking actuator apparatus for an information storage drive system of the type utilizing a focused optical beam to read and/or write information on data tracks of a recording medium. More particularly it relates to single stage tracking actuator adapted both to move an optical read or read/write head rapidly along a tracking axis to locate and position the optical beam on a predetermined data track and also to maintain the beam centered on the track during a read and/or write operation of the drive system.

BACKGROUND OF THE INVENTION

Information storage systems that use an optical beam to sense certain physical conditions on the surface of a storage medium representing bits of stored data are well known to have very high density information storage capacities. In order to take useful advantage of these high storage capacities, it is desirable that these systems be provided with head positioning drives, i.e. tracking actuators, that are capable of very fast seek times to position the focused optical beam on a desired data track selected by the host computer out of many thousands of such tracks. In this seek mode of operation, the head mass must be moved rapidly through optimally determined acceleration and deceleration profiles between beginning and ending track locations that could be adjacent to each other or several thousand tracks apart. Additionally, once the desired track has been reached, the head must be precisely controlled in a tracking mode of operation during which the beam is maintained in centered registry with the track, which is typically less than a micron in width, as data is being read or written. It is an object of the present invention to provide a tracking actuator for an optical or magneto-optical system that is not only capable of providing the level of tracking mode performance required by optical drives but also provides track seek (access) time performance that is at least comparable to, and in some cases better than, existing high capacity magnetic drives such as conventionally known Winchester and Bernoulli drives.

Various forms of tracking actuators are known to provide reasonably fast access time and good tracking control in magnetic disk drives of the aforementioned type. In a typical arrangement, the carriage for the read/write heads is mounted with ball bearing rollers on a pair of tracks, or races, and the carriage is driven by a stepper motor or voice coil motor to translate the head linearly in a radial direction over the data tracks formed on the surface of the recording disk. This arrangement has the advantage of providing a true linear tracking axis but has the disadvantage of imposing roller bearing irregularities that are not compatible with the extremely small, precise motions that are encountered in optical drives. U.S. Pat. Re. No. 32,285 is an example of a voice coil driven actuator utilized in a roller/race carriage type of hard disk drive system that employs a pair of separate voice coil motors positioned symmetrically on opposite sides of the carriage. Although not expressly mentioned in the patent, it is typical for the rollers to be mounted with ball bearings to eliminate friction. While satisfactory for magnetic drives, ball bearings suffer from fretting corrosion when subjected to the sort of micro-fine vibratory motion encountered in optical drives. Fretting corrosion occurs when the vibratory motion drives lubricant out from between the ball and race leaving a metal-to-metal contact during the period of vibratory motion.

The specification of the patent suggests in the introductory portion that s single drive coil somehow wrapped around the carriage could also be employed as an alternative to the pair of coils, however no embodiment of this type is disclosed, nor is it readily apparent from the disclosure how such an embodiment would be constructed. However, taking into account the pair of coils that are disclosed, it is apparent that a substantial amount of unused wire, i.e. portions of the coil not involved in developing the required motive forces, would be required to span the carriage space between the dual magnetic circuits on either side of the carriage. This unused wire is detrimental since it represents dead weight in the moving mass that undesirably increases the power consumption needed to achieve desired operating performance.

Moreover, purely magnetic information storage systems generally have tracking requirements that are not as precise or stringent as those found in the case of optical and magneto-optical storage system. Because of the extremely small track-to-track spacing found on optical and magneto-optical disks, on the order of 1.6 microns, information storage systems that use optical beams to scan recorded information on such narrow data tracks conventionally employ a two stage positioning arrangement. The first stage, or seek mode of operation, may typically involve a first drive apparatus, either stepper motor or voice coil, to move the entire mass of the head to rapidly position the beam in the vicinity of the desired track in as short an access time as is possible. In the second stage, or tracking mode of operation, a separate drive apparatus, usually another voice coil moved into coarse position over the tracks by the first actuator stage, is used to control the lateral positioning of just the beam objective lens to complete the positioning of the beam and to maintain the beam centered on the data track during read and/or write operation. In general, the reason for employing a separate tracking actuator for the objective lens, is the difficulty that conventional head positioning means have in achieving the required high frequency response for proper tracking error correction, as opposed to the seek mode of operation, particularly in compact, cost sensitive applications. U.S. Pat. No. 4,607,913 discloses a linear tracking actuator of the general type disclosed in the aforementioned U.S. Pat. Re. No. 32,285 but adapted for use with an optical read/write system. In this disclosure, an axially movable beam objective lens is mounted by flexures to a carriage between a pair of sleeves riding on guide rods. The sleeves are made of tetra-flouroethylene to reduce friction. A pair of drive coils are wrapped around the sleeves and have their outer turn segments disposed in longitudinal air gaps formed by elongated magnets in parallel with the associated guide rods. The objective lens for this system is carried in a separate mount spanning the parallel guide rails and is attached to the main carriage by the elongated flexures. A separate pair of radial drive coils are provided for the objective lens to provide additional drive force in proportion to the ratio of masses of the objective mount to the main carriage so that the flexures do not have to be relied on to convey the radial driving force from the carriage to the objective mount. This complex arrangement requires, among other things, that the magnets be extended to cover two sets of actuator coils.

In an effort to address problems of the nature described above, an early form of erasable magneto-optical disk drive was developed at Philips Research Laboratories in Hamburg, West Germany and which was reported in the Dec. 29, 1982 issue of "Electronics" magazine at page 45. In this arrangement, a Faraday effect optical light source and sensor assembly was mounted on the end of a bifurcated arm extending over a magneto-optical disk from a rectangular frame suspended by a pair of parallel flexure springs for friction-free movement of the arm and head along a tracking axis over the surface of the disk. This apparatus was a single stage actuator in that both the track seek and tracking modes of operation were accomplished with a single drive. The driving force for this apparatus was provided by a voice coil motor arrangement with the voice coil mounted on the frame spaced away from the light source head and with the plane of the coil turns oriented parallel to the tracking axis.

Although both of this voice coil, flexure mounted design proved to be operative for its intended purpose of eliminating the problems associated with track mounted designs, it did not prove to be satisfactory for commercial application. This actuator employed a beam source and detector cantilevered out beyond the flexure mount and required a separate, relatively large focus actuator to carry the tracking actuator flexure mount which added undesirable mass to the system. As such, this drive proved unsatisfactory to meet stringent performance requirements associated with competitive high capacity drive systems, and was not suitable for compact, low cost personal computer applications.

It is therefore an object of the present invention to provide a tracking actuator drive system for an optical or magneto-optical disk information storage system that avoids the drawbacks and disadvantages of prior actuator drive systems.

It is a further object to provide a tracking actuator drive system that lends itself to compact design for use in a half height format useful in personal computers.

It is yet a further object to provide a tracking actuator drive system that provides rapid seek times comparable to seek times of existing high performance Bernoulli and Winchester magnetic disk drives.

It is still a further an object to provide a single stage tracking actuator for an optical or magneto-optical disk drive system with relatively low mass that does not require a separate tracking actuator for the objective lens to maintain the optical sensing beam centered on the data track during read/write operation.

SUMMARY OF THE INVENTION

In accordance with the invention, therefore, there is provided single stage tracking actuator apparatus for an optical beam information storage drive system adapted in a track seek mode to move an optical read/write head rapidly along a drive path which is parallel with a planar surface of a recording medium and is generally parallel with a line normal to a plurality of closely spaced parallel data tracks formed on the planar recording surface thereby to position a focused optical beam generated within the head onto a predetermined one of the recording tracks, and adapted in a tracking mode to maintain the beam centered on the predetermined track during a read and/or write operation of the system. Accordingly, the apparatus of the invention comprises head means for generating the focused optical beam, the head means having first and second end portions with the beam emanating from one of the end portions. The head means has a trio of mutually orthogonal axial center lines, the first of which is a longitudinal center line passing through the end portion of the head means. The first and second of the center lines define a first central plane parallel with the recording medium surface, the second and third of which define a second central plane normal to the recording surface.

According to an important feature of the invention, the head means is mounted in the disk drive system by flexure means to provide the head means with friction-free reciprocal translation along the drive path. The flexure means includes at least one pair of parallel leaf springs having the free ends thereof attached respectively to the first and second end portions substantially equidistant from the second central plane thereof. In accord with another important feature of the invention, magnetic circuit means are provided for establishing mutually isolated magnetic fields across a plurality of elongated air gaps on opposite sides of the head means intermediate the end portions thereof. The elongated dimensions of the air gaps are parallel with the first center line of the head means and symmetrically disposed on either side of the second central plane, while the cross sections of the air gaps parallel with the second central plane are symmetrically disposed on either side of the first central plane of the head means. The apparatus further comprises electromagnetic coil means having a plurality of coil turns formed coaxially about the longitudinal center line of the head means and secured to the head means centrally of the points at which the leaf springs are attached to the head means. The end turn segments of the coil are spaced away from the head means symmetrically on opposite sides of the longitudinal center line thereof and are disposed in the air gaps to provide driving motive force for the actuator. Finally, the apparatus includes means for supplying tracking actuator signals to the coil means to cause the coil and head means to translate along the drive path in both the track seek and tracking modes of operation.

DETAILED DESCRIPTION

Figure 1:
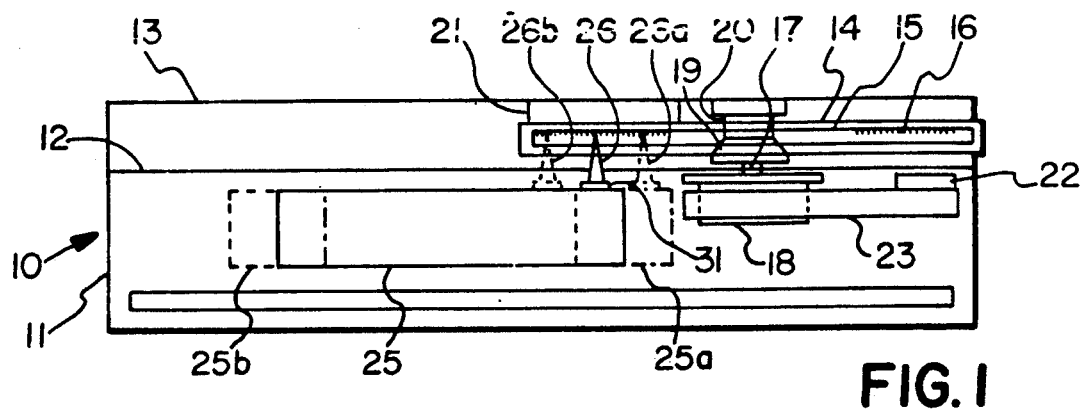
FIG. 1 is a schematic side elevation view of a magneto-optical disk drive system embodying tracking actuator apparatus of the present invention.

Referring to FIG. 1, information storage disk drive system 10 includes a base enclosure 11 having an upper mount plate 12 which forms a mounting base for the components of the system 10. An upper enclosure 13 includes provision for receiving and holding a disk cartridge 14 which has nested therein a magneto-optical information storage disk 15. A plurality of closely spaced parallel data tracks 16 (FIG. 2) are formed in grooves on the upper planar surface of disk 15 by deposition of a recording medium comprising a thin layer of suitable thermo-magneto-optical material utilizing processes well known for this purpose. As is known in the art, grooves 16 may be concentric with the center of disk 15 or they may comprise "pseudo grooves", actually a single spiral groove with the center of the spiral at the center of the disk. A drive spindle 17 is driven by a spindle motor 18 and has at its upper end a disk centering cone 19 which cooperates with a disk clamp 20 to engage and rotationally drive disk 15 during read/write operation of the system 10. An electromagnetic bias coil 21 is held in place on upper housing 13 above disk 15 and is supplied with current from a source, not shown, to generate a concentrated magnetic field which is applied to the recording medium of the data tracks 16 as part of the magneto-optical data writing process. Spindle motor 18 is mounted on a mount plate 23 and is driven axially by a load drive mechanism 22 which operates, in part, to raise spindle motor 18 into engagement with disk 15 after cartridge 14 has been inserted into upper enclosure 13 to commence read/write operation and to lower spindle motor 18 to allow removal of cartridge 14 by the user of the computer in which the disk drive system is installed.

Disk drive system 10 is also provided with a read/write head 25 which is moved in a controlled manner from an at-rest position, shown in solid outline, between extreme positions 25a, 25b by tracking actuator apparatus of the invention along a drive path which is parallel to the planar surface of disk 15 thereby to position a focused laser optical beam 26 generated within head 25 onto a selected one of data tracks 16 within the span of data tracks between the extreme positions 26a, 26b of beam 26. Beam 26 is focused by an objective lens 31 mounted within head 25 by means of a single axis actuator that operates to move the lens axially to maintain proper focus of beam 26 on the data tracks 16 but is fixed (non-movable) in the lateral direction. Consequently, tracking actuator apparatus of the invention operates to provide single stage lateral positioning of the beam on a data track by controlling movement of head 25 both to rapidly seek a selected data track as determined by the host computer (not shown) as well as to employ microscopically small tracking error corrections at very high frequencies or rates needed to maintain the beam on the selected data track during the read/write operation of the drive system.

Figure 2:
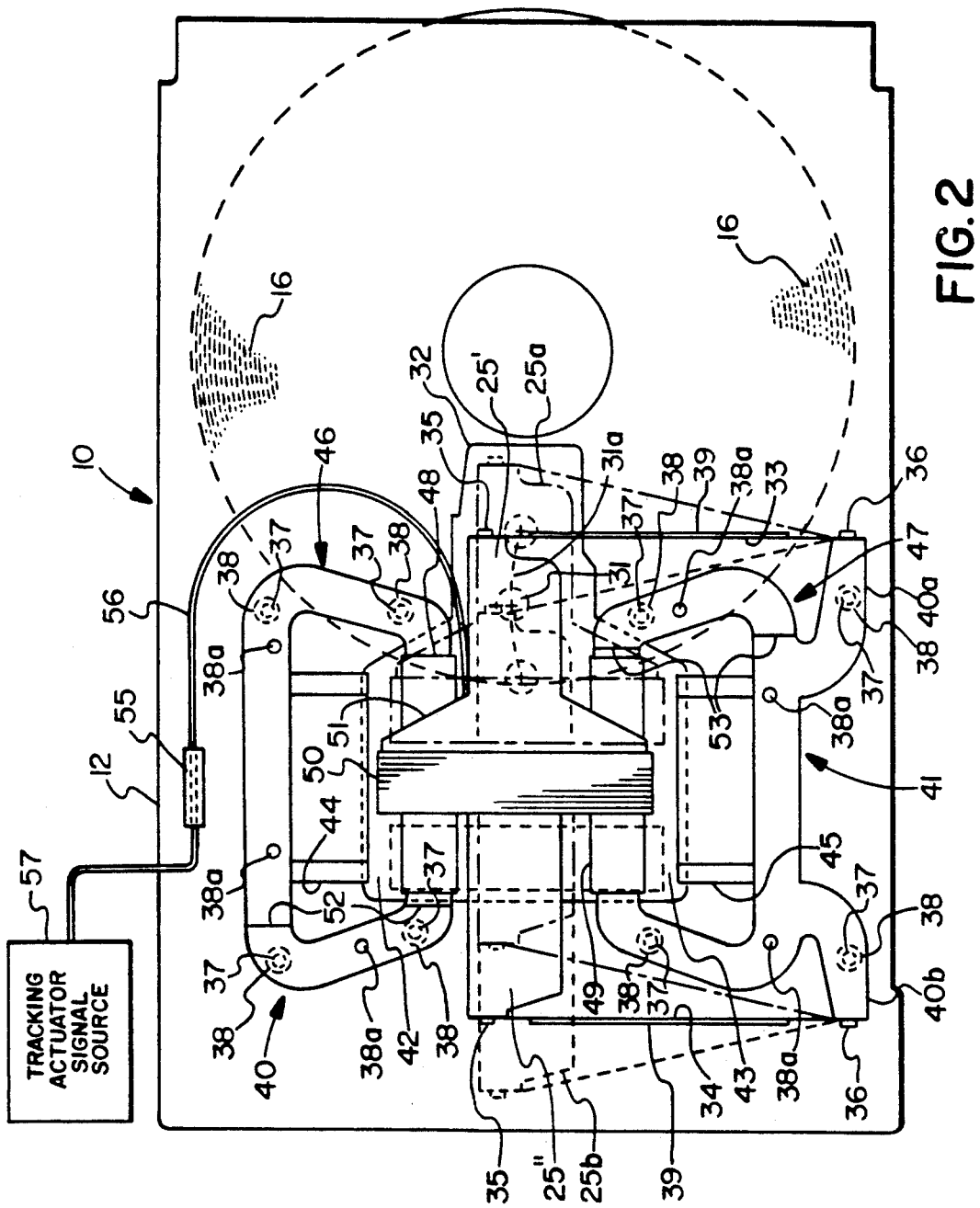
FIG. 2 is a bottom plan view of the drive system of FIG. 1 showing details of the tracking actuator apparatus constructed in accordance with the present invention.

Referring now to FIG. 2, there is shown a bottom plan view of single stage tracking actuator apparatus 30 adapted to carry out the aforedescribed operation in accordance with the invention. To this end, actuator apparatus 30 includes head means 25 comprised of a housing having end portions 25' and 25" and which is preferably made of a strong, light weight material, such as magnesium. Head 25 includes within the housing optical read/write components for generating the high intensity laser beam 26 (FIG. 1) focused by objective lens 31 in front end portion 25' through an aperture 32 in mount plate 12 onto data tracks 16 of disk 15. A more complete description of the optical structure of head 25 may be found in copending U.S. patent application Ser. No. 234,767 filed Aug. 8, 1988.

Figure 3:
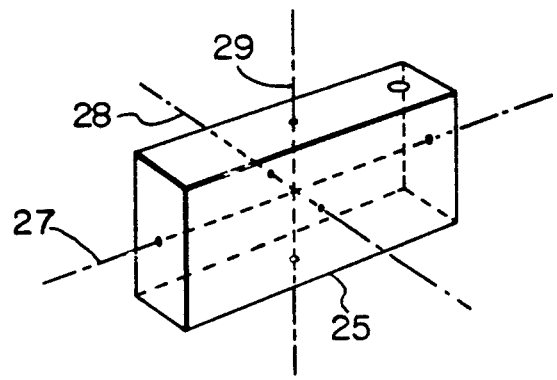
FIG. 3 is a schematic perspective view of the read/write head of FIG. 1 useful in explaining features of the present invention.

To aid in defining the spatial relationships of the various components of the tracking actuator of this invention, FIG. 3 schematically illustrates head 25 with a trio of mutually orthogonal axial center lines 27, 28 and 29. The first center line 27 extends longitudinally through end portions 25', 25" parallel to the surface of disk 15. Thus, longitudinal center line 27, together with the second center line 28 extending through the longitudinal sides of head 25, define a first central plane which is parallel to the recording surface of disk 15. Similarly, center line 28 and vertical center line 29 define a second central plane which is perpendicular to the recording surface of disk 15 and to the radial line extending through the center of disk 15.

Flexure means including a pair of elongated, flat leaf springs 33, 34 are provided to hold head 25 suspended with friction-free translatable motion along the drive path between extremes 25a, 25b. To this end, the free ends of springs 33, 34 are secured to the head end portions 25' and 25", respectively, by suitable means such as bolts 35. The distal fixed ends of springs 33, 34 are secured to mount plate 12 near the side thereof by bolts 36 affixed to extension arms 40a and 40b of ring core 47 which, in turn, is bolted by bolts 37 onto positioning pads 38 formed on the undersurface of mount plate 12. In this manner, head 25 is suspended, in cantilever fashion, in position under disk 15. The points at which springs 33, 34 are attached to extension arms 40a, 40b lie in a line that is parallel to the radial line extending through head 25 and the center of disk 15. Additionally, the distance between bolts 36 on extension arms 40a, 40b and bolts 35 on head 25 are equal for both springs and thus head 25 is held with its longitudinal center line 27 parallel to the radial line throughout the range of translation motion. Leaf springs 33, 34 may be formed of stainless spring steel on the order of 0.002–0.003 inches thick. In a preferred form of the invention, each of the springs has a laminate of constrained layer damping material 39 adhesively secured to the flat surfaces of the springs to dampen resonant forces on the springs during high frequency translating movement of head 25.

As can be seen in FIG. 2, the flexure suspension of head 25 results in a slightly arcuate path 31a for beam 26 as head 25 is translated back and forth between extreme positions 25', 25". To minimize the radius of the arc, leaf springs 33, 34 are made as long as possible within the physical constraints of the dimensions of the disk drive system. To this end the fixed ends of the leaf springs are mounted as close to the side of mount plate 12 as is reasonably possible. In a similar vein, the span between the springs is made as wide as feasible with a view to minimizing any tendency of the head to twist or rotate about its center. Consequently it is preferred that the free ends of the springs be secured on the endmost surfaces of head 25 as shown in FIG. 2.

Magnetic circuit means 40 and 41, comprised of separate assemblies of an elongated magnet 44 with ring core 46 and an elongated magnet 45 with ring core 47, respectively, are provided for establishing a pair of mutually isolated magnetic fields across a pair of elongated air gaps 42, 43 on opposite sides of head 25 intermediate end portions 25' and 25". The elongated dimension of each of the pair of air gaps 42, 43 extends in parallel with the longitudinal center line of head 25. Ring cores 46 and 47 are each generally in the shape of a flattened ring with elongated legs parallel to the longitudinal center line of head 25. The legs closest to head 25 are shorter than the associated outer legs and, as a consequence, the side legs of each are seen to converge from the outer to the inner legs. The longer outer legs are preferred so as to minimize undesirable fringe effects in the air gaps at the ends of the magnets. It will be seen that the magnetic circuit means 41 is nested within the span of leaf springs 33, 34 which is done to aid in achieving a compact design of the overall drive system by keeping the leaf springs and magnet circuits in the same plane. As a consequence, the configuration of the ring core 47, and in particular the lengths of the inner and outer legs, is therefore selected to allow the span of flexure springs 33, 34 to skew right and left, as seen in FIG. 2, i.e. frontward and rearward in the drive system, without interference between the flexure springs and the ring core.

Figure 5:
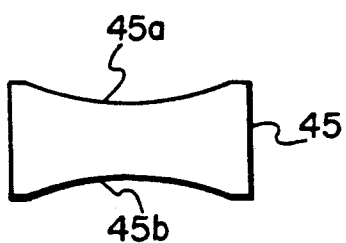
FIG. 5 is a side view of a magnet useful in the construction of the tracking actuator of the invention.

Magnets 44 and 45 are secured by suitable means, such as an adhesive, to the inner surface of the outer legs of each core and are magnetized in a direction that is parallel with the second center line 28 passing through head 25 (FIG. 3). The magnets are spaced from the inner legs of each core thus forming air gaps 42, 43 with the magnetic field flux lines extending thereacross parallel with second center line 28. As shown in FIG. 5, the vertical outline of each of the magnets 44, 45, in the elongated direction, is somewhat in the shape of a bow tie, with upper and lower surfaces 44a, 45a and 44b, 45b, respectively, gradually increasing arcuately from the centers to the outer ends to provide concave upper and lower surfaces. This configuration for the magnets is selected to provide a more uniform net force constant across the full range of skewing of the leaf springs 33, 34. To reduce the inductance of the coil, copper sleeves 48 and 49 are formed about the shorter legs of ring cores 46 and 47, respectively, to serve as conventional shorted turns.

Figure 4:
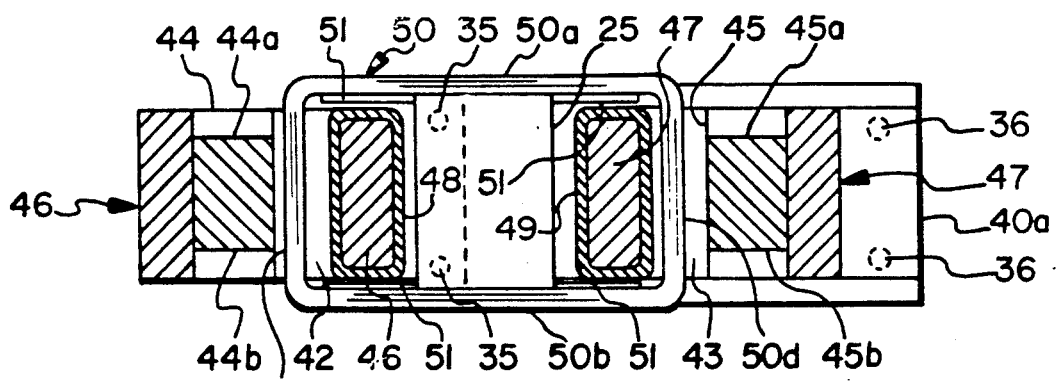
FIG. 4 is an elevation view of the tracking actuator apparatus of FIG. 2 seen in cross section taken midway between the front and rear end portions of the magneto-optical read/write head.

The tracking actuator also includes an electromagnetic coil 50, preferably of elongated rectangular cross section with elongated side turns 50a, 50b secured by suitable means, such as an adhesive, to the upper and lower surfaces of head 25 supported by laterally extended wings 51 above and below the head. Coil 50 is affixed to head 25 intermediate the end portions 25', 25" with the axial of the coil coincident with the longitudinal center 27 of the head. The coil is preferably centered between the points at which the free ends of flexure springs 33, 34 are attached to the head and is symmetrically disposed on either side of the second central plane formed by head axial center lines 28, 29. The end turn segments 50c, 50d of coil 50 are disposed in air gaps 42, 43, respectively, with the wire of the end turns orthogonal to the flux lines across the gaps. Additionally, the assembly of head 25 with the magnetic circuit means 40, 41 is such that the coil end turn segments 50c, 50d are centrally positioned, front to rear, in the air gaps when flexure leaf spring are in the at-rest, unstressed position. As seen in FIG. 4, because of the slightly arcuate nature of the drive path for head 25, the magnet-to-pole air gap width is made sufficiently wide to accommodate the effective side-to-side motion of the coil end turns 50c, 50d as the head is translated back and forth, as shown in dotted outline in FIG. 2. Similarly, the lateral spacing between the inner legs 46a, 47a is chosen to accommodate the lateral motion of head 25 resulting from the slightly arcuate nature of the drive path. A side leg of each ring core is removable, as at junctures 52 and 53, to allow assembly of the coil 50 with the end turn segments in air gaps 42, 43.

Means including input terminals 55 and electrical connecting lines 56 are provided for coupling tracking actuator signals from an actuator servo signal source 57 to the drive coil 50. Because of the reciprocating movement of head 25, lines 56 are preferably formed in a flexible signal bus tape harness. As is well known in the magnetic hard disk drive art, the tracking servo signals may comprise analog signals which, in the seek mode, drive head 25 with a controlled acceleration in the first half of the seek operation followed by a controlled deceleration in the second half of the seek operation. As the head approaches the desired track, the servo signal may then switch to a position servo signal in which the position of the head over the track is controlled to find and maintain the center of the desired track. A tracking error signal detected from the reflected optical beam is used for providing actual velocity and position signals in the servo loop which generates the drive signals to input terminals 55.

It can be seen from the foregoing that what has been disclosed is a very compact tracking actuator for an optical read beam type of information storage drive system. The smooth friction-free translatable motion of the flexure spring suspension allows the use of single stage tracking operation that significantly reduces the complexity of the objective lens mount in the head and substantially improves the track access time performance of the actuator over conventionally known optical beam information storage drive systems.

While there has been described what at present is believed to be a preferred embodiment of the invention, it will be appreciated by those skilled in the art that various modifications may be made without departing from the spirit and scope of the invention. For example, although an enclosed ring core is illustrated in the enclosed embodiment, it possible to employ an open-ended C-shaped core with substantially all of the flux return path occuring through the single remaining side leg. Further, head 25 of FIG. 2 includes optical means for detecting Kerr effect rotation in the polarization of optical beam 26 reflected back from the disk surface. Head 25 might alternatively include optical means for detecting Faraday effect rotation occuring in the transmission of the beam through the the media of the disk. In this event, leaf spring 33 and front portion 25' of head 25 would be bifurcated to fit over the disk 15 to allow the beam objective lens and beam sensor to fit on opposite sides of the disk. With the foregoing in mind, it should be clear that it is intended that the invention is to be limited only by the scope of the claims appended hereto.

What is claimed is:

1. Single stage tracking actuator apparatus for an optical or magneto-optical information storage drive system adapted to move a read/write head rapidly, in a track seek mode, along a drive path parallel with a planar surface of a recording medium and generally parallel with a line normal to a plurality of closely spaced parallel data tracks formed on said planar surface thereby to position a focused optical beam generated within the head onto a predetermined one of said data tracks, and adapted to maintain the beam centered, in a tracking mode, on the predetermined track during a read and/or write operation of the system, said apparatus comprising:

head means for generating said optical beam, said head means having first and second end portions with said optical beam emanating from one of said end portions, said head means having a trio of mutually orthogonal axial center lines, a first of which is longitudinal through said end portions and, with a second center line, defines a first central plane parallel with the recording medium surface, the second and third of said center lines defining a second central plane normal to the recording medium surface;

flexure means for suspending said head means with smooth, friction-free translation along said drive path between extremes centered on said second central plane of the head means, said flexure means having at least one pair of parallel leaf springs having respective free ends attached at said first and second head end portions substantially equidistant from said second central plane;

a pair of magnetic circuits for establishing mutually isolated magnetic fields across a plurality of elongated air gaps individually disposed on opposite sides of the head means intermediate the end portions thereof, the elongated dimensions of each of said air gaps being parallel with the longitudinal center line of said head means and symmetrically disposed on either side of said second central plane, the air gap cross sections parallel with the second central plane of the head means being symmetrically disposed on either side of said first central plane; in which each magnetic circuit comprises one elongated permanent magnet and an elongated, ring shaped core having a first elongated leg lying adjacent said head means parallel with said first axial center line and a second elongated leg remote from said head means and parallel with said first leg, said first and second legs being joined by relatively shorter connecting legs to form a closed magnetic circuit for said magnet, said magnet being positioned inside said core ring in abutting alignment with said second leg and being spaced from said first leg to form said air gap;

electromagnetic coil means having a plurality of turns formed coaxially about the first axial center line of said head means and secured to the head means centrally of the points at which said leaf spring are attached to the head means, said coil means having end turn segments spaced symmetrically away from said head means and disposed in said air gaps;

and means for supplying tracking actuator signals to said coil means to cause said coil and head means to move longitudinally along said path in both the seek and tracking modes of operation.

2. Tracking actuator apparatus according to claim 1 in which said head means includes optical means for generating and focusing a laser beam on said recording medium and for detecting signal information contained in the reflection of said laser beam from the recording medium back into said head means.

3. Tracking actuator apparatus according to claim 1 further comprising a mount housing having a base plate, two sides of which extend in parallel with said first axial center line of the head means; in which the first axial center line extends longitudinally of the head means through the end portions thereof and in which the ends of said leaf spring remote from the head means are fixedly secured adjacent one of the sides of the base plate at points lying in a line parallel with said first axial center line of the head means, the free ends of said springs being secured to extreme end surfaces of the head means at points lying in a line parallel with said first axial center line thereby forming an open span between said leaf springs; and in which one of said magnetic circuit means is positioned entirely within the span formed by said leaf springs.

4. Tracking actuator apparatus according to claim 3 in which each of said leaf springs has a laminate of constrained layer damping material adhesively secured to the flat surfaces of the springs to dampen resonant forces on the springs during high frequency reciprocal movement of said head.

5. An information storage drive system of the type employing an optical beam to read and/or write data on recording tracks formed on the surface of a disk shaped recording medium, the system comprising:

a drive housing having a horizontal rectangular baseplate with front, rear and side edges and with a disk drive aperture and an optical beam aperture;

means for receiving said disk in horizontal rotationally operative position above said baseplate;

disk drive means positioned below said baseplate and extending through said disk drive aperture for rotationally driving said disk;

head means positioned below said baseplate for generating and projecting an optical beam vertically upwards through said optical beam aperture onto the data tracks on said disk, said head means having a longitudinal dimension radially oriented relative to said disk and terminating in front and rear end portions, said front portion having a horizontally fixed, axially movable objective lens adapted to focus said optical beam on said disk data tracks;

flexure means for suspending said head means below said baseplate with friction-free translatable motion longitudinally in said radial direction along a drive path having an at-rest position centered between opposite end points of said translation motion, said flexure means including at least one pair of parallel leaf springs having respective free ends attached at said first and second end portions of the head means substantially equidistant from the midpoint of said longitudinal dimension;

a pair of magnetic circuits for establishing a pair of mutually isolated magnetic fields across a pair of elongated air gaps positioned on opposite sides of the head means intermediate said end portions, said air gaps being parallel with a longitudinal axial center line of said head means and being centered on said longitudinal midpoint of said head means when said head means is in its at-rest position, said air gaps having cross sections orthogonal to said axial center line which are centered vertically on a horizontal plane passing through said longitudinal axial center line; in which each magnetic circuit comprises one elongated permanent magnet and an elongated, ring shaped core having a first elongated leg lying adjacent said head means parallel with said first axial center line and a second elongated leg remote from said head means and parallel with said first leg, said first and second legs being joined by relatively shorter connecting legs to form a closed magnetic circuit for said magnet, said magnet being positioned inside said core ring in abutting alignment with said second leg and being spaced from said first leg to form said air gap;

coil means having a plurality of turns formed about said head means in perpendicular relation to said radial direction and secured to said head means intermediate said front and rear end portions thereof with the axial center of said coil means being coincident with said longitudinal axial center line of the head means and with said coil turns symmetrically disposed on either side of said longitudinal midpoint of the head means, said coil means having opposite end turn segments spaced away from said head means symmetrically of said longitudinal axial center line and disposed in said air gaps;

and means for supplying tracking actuator signals to said coil means to cause said head means to move longitudinally along said path in both the track seek mode of operation in which the head is moved radially to reposition the optical beam onto a new predetermined data track and the tracking mode of operation in which the head is controlled to maintain the optical beam centered on the predetermined data track during a data read and/or write operation.

6. Single stage tracking actuator apparatus for an optical or magneto-optical information storage drive system adapted to move a read/write head rapidly, in a track seek mode, along a drive path parallel with a planar surface of a recording medium and generally parallel with a line normal to a plurality of closely spaced parallel data tracks formed on said planar surface thereby to position a focused optical beam generated within the head onto a predetermined one of said data tracks, and adapted to maintain the beam centered, in a tracking mode, on the predetermined track during a read and/or write operation of the system, said apparatus comprising:

head means for generating said optical beam, said head means having first and second end portions with said optical beam emanating from one of said end portions, said head means having a trio of mutually orthogonal axial center lines, a first of which is longitudinal through said end portions and, with a second center line, defines a first central plane parallel with the recording medium surface, the second and third of said center lines defining a second central plane normal to the recording medium surface;

flexure means for suspending said head means with smooth, friction-free translation along said drive path between extremes centered on said second central plane of the head means, said flexure means having at least one pair of parallel leaf springs having respective free ends attached at said first and second head end portions substantially equidistant from said second central plane;

a pair of magnetic circuits for establishing mutually isolated magnetic fields across a plurality of elongated air gaps individually disposed on opposite sides of the head means intermediate the end portions thereof, the elongated dimensions of each of said air gaps being parallel with the longitudinal center line of said head means and symmetrically disposed on either side of said second central plane, the air gap cross sections parallel with the second central plane of the head means being symmetrically disposed on either side of said first central plane; in which one of said magnetic circuits is positioned entirely within the span formed by said leaf springs, and in which each magnetic circuit includes an elongated permanent magnet and an elongated, generally rectilinear shaped core having a first elongated leg adjacent to said head means and parallel with said first center line thereof and a second elongated leg remote from said head means and in parallel with said first leg, said first and second legs being joined by relatively shorter connecting legs to form a closed magnetic circuit for said magnet, said magnet being positioned inside said core ring in abutting alignment with said second leg and being spaced from said first leg to form said air gap, and in which said span of leaf springs is in the general shape of a parallelogram, the planer outline of which skews left and right of ·center as said head means is translated reciprocally along said drive path, and in which the length of the core leg inside said span closest to the head means is shorter than the length of the core leg remote from the head means by an amount sufficient to allow skewing of the span without contact between the leaf springs and the core;

electromagnetic coil means having a plurality of turns formed coaxially about the first axial center line of said head means and secured to the head means centrally of the points at which said leaf spring are attached to the head means, said coil means having end turn segments spaced symmetrically away from said head means and disposed in said air gaps; and means for supplying tracking actuator signals to said coil means to cause said coil and head means to move longitudinally along said path in both the seek and tracking modes of operation.

7. Tracking acutator apparatus according to claim 6 in which said head means includes optical means for generating and focusing a laser beam on said recording medium and for detecting signal information contained in the reflection of said laser beam from the recording medium back into said head means.

8. Tracking actuator apparatus according to claim 6 further comprising a mount housing having a base plate, two sides of which extend in parallel with said first axial center line of the head means; in which the first axial center line extends longitudinally of the head means through the end portions thereof and in which the ends of said leaf springs remote from the head means are fixedly secured adjacent one of the sides of the base plate at points lying in a line parallel with said first axial center line of the head means, the free ends of said springs being secured to extreme end surfaces of the head means at points lying in a line parallel with said first axial center line thereby forming an open span between said leaf springs.

9. An information storage drive system of the type employing an optical beam to read and/or write data on recording tracks formed on the surface of a disk shaped recording medium, the system comprising:

a drive housing having a horizontal rectangular baseplate with front, rear and side edges and with a disk drive aperture and an optical beam aperture;

means for receiving said disk in horizontal rotationally operative position above said baseplate;

disk drive means positioned below said baseplate and extending through said disk drive aperture for rotationally driving said disk;

head means positioned below said baseplate for generating and projecting an optical beam vertically upwards through said optical beam aperture onto the data tracks on said disk, said head means having a longitudinal dimension radially oriented relative to said disk and terminating in front and rear end portions, said front portion having a horizontally fixed, axially movable objective lens adapted to focus said optical beam on said disk data tracks;

flexure means for suspending said head means below said baseplate with friction-free translatable motion longitudinally in said radial direction along a drive path having an at-rest position centered between opposite end points of said translation motion, said flexure means including at least one pair of parallel leaf springs having respective free ends attached at said first and second end portions of the head means substantially equidistant from the midpoint of said longitudinal dimension;

a pair of magnetic circuits for establishing a pair of mutually isolated magnetic fields across a pair of elongated air gaps positioned on opposite sides of the head means intermediate said end portions, said air gaps being parallel with a longitudinal axial center line of said head means and being centered on said longitudinal midpoint of said head means when said head means is in its at-rest position, said air gaps having cross sections orthogonal to said axial center line which are centered vertically on a horizontal plane passing through said longitudinal axial center line; in which one of said magnetic circuits is positioned entirely within the span formed by said leaf springs, and in which each magnetic circuit includes an elongated permanent magnet and an elongated, generally rectilinear shaped core having a first elongated leg adjacent to said head means and parallel with said first center line thereof and a second elongated leg remote from said head means and in parallel with said first leg, said first and second legs being joined by relatively shorter connecting legs to form a closed magnetic circuit for said magnet, said magnet being positioned inside said core ring in abutting alignment with said second leg and being spaced from said first leg to form said air gap, and in which said span of leaf springs is in the general shape of a parallelogram, the planar outline of which skews left and right of center as said head means is translated reciprocally along said drive path, and in which the length of the core leg inside said span closest to the head means is shorter than the length of the core leg remote from the head means by an amount sufficient to allow skewing of the span without contact between the leaf springs and the core;

coil means having a plurality of turns formed about said head means in perpendicular relation to said radial direction and secured to said head means intermediate said front and rear end portions thereof with the axial center of said coil means being coincident with said longitudinal axial center line of the head means and with said coil turns symmetrically disposed on either side of said longitudinal midpoint of the head means, said coil means having opposite end turn segments spaced away from said head means symmetrically of said longitudinal axial center line and disposed in said air gaps; and means for supplying tracking actuator signals to said coil means to cause said head means to move longitudinally along said path in both the track seek mode of operation in which the head is moved radially to reposition the optical beam onto a new predetermined data track and the tracking mode of operation in which the head is controlled to maintain the optical beam centered on the predetermined data track during a data read and/or write operation.

* * * * *